UNITED STATES PATENT OFFICE.

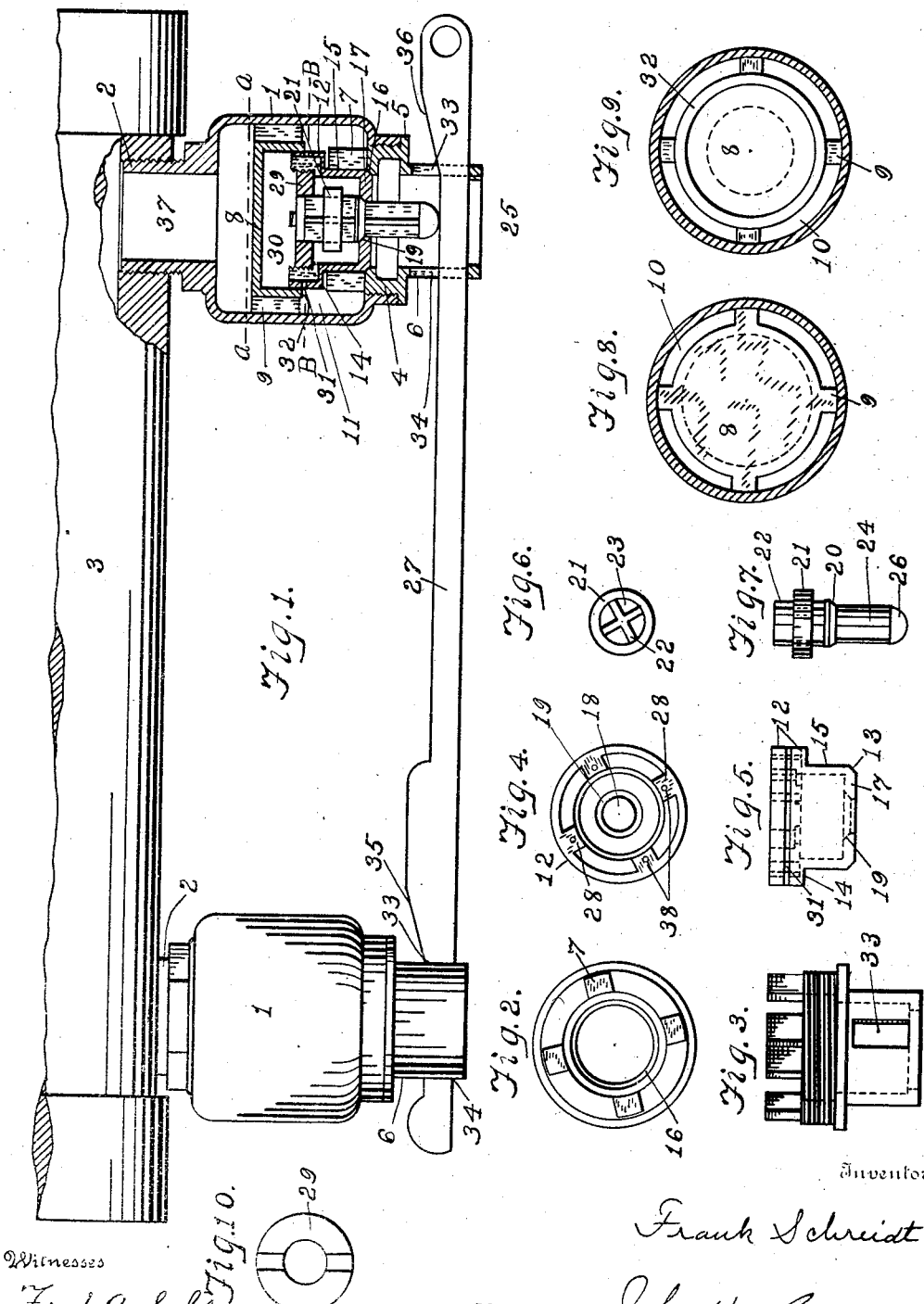

FRANK SCHREIDT, OF MANSFIELD, OHIO.

RELIEF-VALVE.

No. 896,468.   Specification of Letters Patent.   Patented Aug. 18, 1908.

Application filed March 27, 1907. Serial No. 364,936.

*To all whom it may concern:*

Be it known that I, FRANK SCHREIDT, a citizen of the United States, residing at Mansfield, in the county of Richland and State of Ohio, have invented certain new and useful Improvements in Relief-Valves, of which the following is a specification.

My invention relates to relief valves and the type shown in the drawings is especially designed and adapted to be used on the cylinders of locomotives. It is obvious, however, that the valve shown can be applied and used to perform its functions on other cylinders or similar apparatus that require an automatic and manual means of relieving the water in the cylinder or other apparatus caused by the condensation of the steam or otherwise.

The objects of my invention are, therefore, to provide a relief valve that will automatically operate without the use of springs when a sudden charge of water is forced into the valve at a pressure greater than the pressure required to normally hold the valves to their seats and further to provide means whereby the steam in the cylinder can be used to exert a pressure against the valves to keep them closed, except in case of the accumulation of water in the cylinder or other apparatus.

A further object of my invention consists in the application of mechanical manual operating means to open the valve at any time it is desired which is a great advantage.

Another object of my invention, is to provide means whereby the valve is prevented from being filled with water from the condensation of steam or other causes whereby the valves are kept open permitting the escape of the water and means to force the valves to their seats.

My invention therefore consists primarily in the construction of a valve casing with a combined steam and air chamber formed within the casing and a main valve and an auxiliary valve placed therein and adapted to be operated automatically and manually if desired.

Further objects of my invention consist in the construction and arrangement of parts as will be more fully described hereinafter.

I attain these and other objects by the mechanism illustrated in the accompanying drawing, in which—

Figure 1 is a side elevation of the lower portion of a horizontal cylinder equipped with two of my relief valves, one shown in vertical section and the other one in side elevation, and attached to the bottom of a horizontal cylinder. This view also shows the means used to manually operate the valves simultaneously. Figs. 2 and 3 are plan and side elevations of the removable tubular member containing the seat and cage for the main valve. Figs. 4 and 5 are plan and side elevations of the main valve and piston. Figs. 6 and 7 are plan and side elevations of the auxiliary valve. Fig. 8 is a cross section of the valve body taken upon the line $a, a$, of Fig. 1. Fig. 9 is an inverted view in cross section of the valve body taken upon the line B, B, of Fig. 1. Fig. 10 is a plan view of the screw-threaded washer used to actuate and limit the upward travel of the auxiliary valve.

In the construction of my valve, I prefer to employ a cylindrical casing 1 with a reduced portion 2 externally screw-threaded and adapted to engage with a screw-threaded aperture provided in the cylinder of a steam engine or other apparatus.

The cylinder 3 shown in the drawing, is the ordinary type used in locomotive construction. A tubular member 4, having an annular outwardly extending flange 5 and a reduced depending portion 6, is provided and externally screw-threaded to engage with the threaded inner periphery of the valve casing. The upper portion of the valve casing is provided with an inverted cup-shaped disk 8 made smaller in diameter than the interior of the valve casing and secured thereto or made integral therewith through the medium of the radiating lugs 9 which leave the annular spaces 10 through which the steam, water or other fluid passes into the valve casing, 11.

A piston 12, having a main valve 13 of less area than the piston made integral therewith, forming an annular shoulder 14 is movably mounted upon the tubular member 4 with the stem 15 of the main valve 13 seated within the arms 7 which guides and keeps it in perfect alinement with the seat 16 of the main valve when it is operated automatically or by manual means. The main valve 14, as will be observed, is formed cup-shaped with an annular inwardly extending flange 17 having an aperture 18 formed in the center thereof which is beveled to form a seat 19.

A winged plunger valve 20 is fitted to the aperture 18 normally resting upon the seat 19. An annular ring 21 is fitted to or made integral with the upper winged portion 22 of the valve leaving the annular spaces 23 for the passage of the steam or water. The grooved valve stem 24 (below the valve seat 20,) depends downwardly into the inlet 25 of the tubular member 4 and its lower extremity 26 is rounded and adapted to rest upon the manual operating inclined bar 27.

The upper portion of the piston 12 is provided with lugs 28 which are interiorly screw-threaded. A screw-threaded washer 29 is provided and adapted to engage with the inner periphery of the screw-threaded lugs 28 of the main valve leaving the annular ring 21 of the auxiliary valve interposed between the washer 29 and the annular flange 17 of the main valve. When the main valve is seated, the upper portion of the piston 12 extends into the inner periphery of the cup-shaped disk 8 forming an air and steam chamber 30 which, when filled with air or steam normally holds the main and auxiliary valves seated.

An annular port 31 is formed in the piston below the face 32 of the cup-shaped disk and communicates through the main valve with the air and steam chamber 30. The port 31 is reduced in size for the purpose of retarding and impeding the water from rushing into the chamber 30 before the main valve is released from the seat, because of the sudden inrush or charge of water from the cylinder into the chamber 30.

In the application of my relief valve to a locomotive cylinder to provide manual means of operation, vertical slots 33 and 34 are formed in the depending portion 6 of the tubular member 4 into which the sliding bar 27 is fitted having inclined surfaces 35 and 36 made integral therewith.

The operation of my relief valve is as follows: Air, at atmospheric pressure passes from the cylinder and under normal conditions prevents the water from entering the chamber 30. When the steam in the cylinder or other apparatus is not condensed, it passes into the inlet 37 which communicates with the interior of the valve-casing and cylinder and passes through the annular openings 10 and through the port 31 and holds the main and auxiliary valves in contact with their respective seats as shown in Fig. 1. When, because of the condensation of the steam in the cylinder or other apparatus an excessive amount of water accumulates therein and is forced through the medium of the piston of the engine or other means into the valve, exerting a greater pressure than the air in the chamber 30 and forced in contact with the annular shoulder 14 of the piston, the piston travels upward opening the main valve and permitting the water to escape through the outlet 25. The size of the port 31 is such that the water cannot pass through this port fast enough to equalize the pressure of the water above the main valve before the main valve opens. When the main valve is forced to travel upward, the annular port, in the piston, is closed by the inner periphery of the cup-shaped disk 8, and the main valve is held open, until the water has passed from the cylinder into the valve and escaped through the outlet 25. The air in the chamber 30 prevents the water from entering the chamber leaving the valve and piston free to raise under any pressure which exerts a pressure greater than atmospheric pressure. When the main valve is forced from its seat, either automatically or manually, in order to expedite its movement in opening, apertures 38 are provided to permit the air to escape as the piston ascends. If for any reason it is desired to manually operate the relief valve, lateral movement is imparted to the sliding bar 27 forcing the inclined faces 35 and 36 in contact with the rounded lower extremity 26 of the auxiliary valve stem imparting an upward movement thereto opening the auxiliary valve port and forcing the annular ring in contact with the washer 29 secured to the inner periphery of the piston 12 which forces the main valve to raise from its seat and permits the water to pass out through the opening 25 until the sliding bar 27 is again moved laterally in the opposite direction assuming the position shown in Fig. 1.

The maual operation of the auxiliary valve and main valve is preferably accomplished by the means shown, it is obvious, however, that other manual means may be used to open the main and auxiliary valves.

Having fully described my invention, what I claim and desire to secure by Letters Patent is:

1. In a relief valve, the combination of a casing having an inverted cup-shaped disk forming a chamber in the upper portion thereof, a piston having a main valve secured thereto, a tubular member secured to the lower portion of said valve having alined slots formed therein, a valve seat formed on the upper portion of said tubular member, an auxiliary valve seat formed on the inwardly extending annular flange of the main valve, an auxiliary valve adapted to contact with said seat having a stem depending downwardly between the alined slots, a sliding bar fitted to said slots upon which the lower extremity of the auxiliary valve rests whereby the auxiliary valve can be opened manually.

2. A relief valve having an inlet and outlet opening, a piston, a main valve secured to said piston normally closing said outlet opening, an inverted cup-shaped disk located in the upper portion of the valve casing forming an air chamber when the piston is within said chamber, means to automatically open said main valve, a washer fitted to the inner periphery of the upper portion of the valve, a ring secured on said auxiliary valve and adapted to contact with said washer when an upward movement is imparted to the auxiliary valve by the sliding inclined bar.

3. A relief valve comprising a casing having an inverted cup-shaped disk formed in the upper portion of the valve casing, a tubular member secured to the valve casing and provided with a valve seat and alined slots, a piston having a cup-shaped main valve made integral therewith, an auxiliary valve mounted in said main valve with a stem depending therefrom, a sliding inclined bar to operate said auxiliary valve.

4. A relief valve comprising a casing, having an inverted cup-shaped disk within the casing to form a chamber, a tubular member secured to the lower portion of the valve casing having a valve seat formed thereon with slots formed in the lower extremity, a piston adapted to enter the main valve chamber carrying a main valve, an auxiliary valve fitted within said main valve with a stem depending therefrom, a sliding inclined bar fitted to said slots, a washer fitted to the inner periphery of the piston, an annular ring fitted to the upper portion of the auxiliary valve and adapted to contact with the washer when the auxiliary valve is manually operated.

5. A relief valve, having an inlet and outlet opening and an air chamber located in the upper portion of the casing, a tubular member secured to the valve casing having upwardly extending wings, a piston adapted to enter the air chamber normally closing it having a port formed therein below the lower extremity of an inverted cup disk to permit the escape of steam and water therefrom.

6. A relief valve comprising a casing having an inlet and outlet opening with an inverted cup-shaped disk located in the upper portion thereof forming an air chamber, a tubular member secured to the outlet opening having an internal annular flange with a valve seat formed thereon, a piston having a main valve made integral therewith normally closing the outlet opening, a valve seat formed on the main valve, an auxiliary valve adapted to contact with a valve seat formed in the main valve, said auxiliary valve having a stem depending therefrom, means to manually open both main and auxiliary valves.

7. In a relief valve, the combination of a valve casing having a chamber located within the casing, a tubular member detachably secured thereto, a piston having a main valve movably mounted upon said tubular member, an auxiliary valve fitted to and carried by said main valve and piston, a ring secured to the auxiliary valve, a washer secured to the inner periphery of the piston, manual and automatic means to operate said valves.

8. A relief valve comprising a casing having outlet and inlet openings, a disk forming a chamber within said casing and located in the upper portion thereof, a tubular member secured to the valve casing having slots formed in the lower extremity, a piston with a cup-shaped main valve movably mounted upon said tubular member, a washer fitted within the inner periphery of the piston, an aperture provided in the bottom of the main valve forming a valve seat, an auxiliary valve adapted to close said seat, a ring formed on the auxiliary valve stem and interposed between the washer of the main valve whereby when the auxiliary valve is given an upward movement the ring is forced to contact with the washer forcing the main valve to open.

In testimony whereof I affix my signature in presence of two witnesses.

FRANK SCHREIDT.

Witnesses:
  CHARLES E. SCHREIDT,
  JOHN H. COSS.